United States Patent [19]

Roy et al.

[11] Patent Number: 5,263,226
[45] Date of Patent: Nov. 23, 1993

[54] SWIVELING WHEEL ASSEMBLY FOR A CART

[75] Inventors: Jean-Pierre Roy, Drancy; Jean Hrabina, Auluoy s/bois, both of France

[73] Assignee: Guitel-Etienne Mobilor, Le Pre Saint-Gervais, France

[21] Appl. No.: 688,524

[22] PCT Filed: Oct. 15, 1990

[86] PCT No.: PCT/FR90/00740

§ 371 Date: Oct. 22, 1991

§ 102(e) Date: Oct. 22, 1991

[87] PCT Pub. No.: WO91/05671

PCT Pub. Date: May 2, 1991

[30] Foreign Application Priority Data

Oct. 17, 1989 [FR] France .................. 89 13579
Oct. 17, 1989 [FR] France .................. 89 13580

[51] Int. Cl.$^5$ .............................................. B60B 33/02
[52] U.S. Cl. ........................................ 16/35 R; 16/20
[58] Field of Search ............. 16/20, 35 D, 35 R, 48

[56] References Cited

U.S. PATENT DOCUMENTS

| | | | |
|---|---|---|---|
| 2,583,858 | 2/1949 | Kostolecki | 16/35 D |
| 2,799,514 | 7/1957 | Kramczak | 280/29 |
| 3,751,757 | 8/1973 | Stosberg et al. | 16/35 R |
| 4,494,272 | 1/1985 | Morita | 16/35 R |
| 5,040,265 | 8/1991 | France et al. | 16/35 R |

FOREIGN PATENT DOCUMENTS

| | | | |
|---|---|---|---|
| 0370716 | 5/1990 | European Pat. Off. | |
| 3525443 | 1/1987 | Fed. Rep. of Germany | 16/35 R |
| 55-156702 | 12/1980 | Japan | 16/35 R |
| 58-218402 | 12/1983 | Japan | 16/35 R |
| WO91/05672 | 5/1991 | PCT Int'l Appl. | |

Primary Examiner—Lowell A. Larson
Assistant Examiner—Donald M. Gurley
Attorney, Agent, or Firm—Pennie & Edmonds

[57] ABSTRACT

A swivelling wheel assembly containing a wheel whose swivelling action around a vertical axle may be locked or unlocked by rotating the wheel in one direction or the other. A curved double control lever is housed in a space between the thrust bearing and the tread of the wheel in the area of the lateral extensions of the fork joint. A lower lever arm holds a friction device engaging the tread of the wheel. An upper lever arm contains a locking means which can be received in a locking slot constructed in a housing component which is fixed relative to the pivot axle. A circular cover of the fork joint contains a tracking groove to guide the upper lever arm.

22 Claims, 4 Drawing Sheets

SWIVELING WHEEL ASSEMBLY FOR A CART

BACKGROUND OF THE INVENTION

This invention relates to the wheel assembly for a cart or other mobile mechanism, of the type which contains a wheel which swivels around a vertical axle, and may be locked or unlocked by the rotation of the latter in one direction or the other. Such wheel assemblies include a thrust bearing with at least one circular housing fixed by axle, a fork joint with at least two lateral extensions whose lower ends support the wheel's horizontal axle, and one upper circular cover connected to the upper ends of the lateral extensions. The cover cooperates with bearings placed around the lower end of the vertical axle so that the fork joint can rotate around the latter. Prior art wheel assemblies are known to contain devices for locking the fork joint in relation to the vertical swivel axle. Such devices are disclosed, for example, in British Patent GB-A-2106-378.

In the device disclosed in the '378 patent, part of the fork joint's locking device is accessible from the outside and may be damaged. Because of this, the proper operation of the device cannot be assured on an ongoing basis. Moreover, the known wheel assembly of this patent requires a major modification to the fork joint, particularly in the area of the wheel axle, which must be capable of moving in the oblong openings made in the fork joint. Another problem with this known swivelling wheel is the fact that controlling the unlocking of the fork joint entails abruptly stopping the wheel for an instant. In addition, the locking devices for the known swivelling wheel assembly have a large number of unprotected individual parts, and are therefore, subject to rapid wear and deterioration.

SUMMARY OF THE INVENTION

The purpose of the present invention is to eliminate such problems and to provide a swivelling wheel which is simple in design, protected against external damage, and has a reduced number of individual parts.

Within the framework of a swivelling wheel assembly of the type referred to above, the assembly of the present invention includes a double control lever which is pivotally mounted in the space between the external housing of the fork joint and the wheel's tread in the area of the fork joint's lateral extensions. The lever is in the form of a curved lever whose two arms encompass an angle of between 90° and 160°. The lower arm moves between two outermost positions located in proximity to a radial plane running through the pivot axis of the lever and the wheel's axis of rotation. The lower lever arm has at its lower end a friction device which is resiliently urged into engagement with the wheel's tread. The upper lever arm is housed in the space enclosed by the fork joint above the wheel's tread, and includes, as a locking means a tip which extends perpendicularly to the lever's pivot axle, and in the direction toward the periphery of the fork joint. A second locking means consists of a locking slot for receiving the locking tip without any significant lateral play. The slot is constructed in the lower end of the vertical swivel axle or a component which is an integral part of the latter. One of the two stops for limiting the pivoting movement of the control lever is placed in the space located about the wheel and between the lateral extensions of the fork joint. This stop works in conjunction with a first lower portion of the control lever. The second stop consists of either the bottom of the locking slot, or the lower bottom edge of the component containing the locking slot, and works in conjunction with the upper lever arm's locking tip.

A circular cover of the fork joint contains a tracking groove extending along the center plane of the fork joint and perpendicular to both the wheel axle and the control lever's pivot axle. The tracking groove operates to guide, without significant lateral play, a portion of the upper lever arm or the locking tip along its entire path between the two outermost positions of the lever.

With the construction of the present invention, the locking device is completely protected, contains a reduced number of individual parts, and is continually operational, despite possible wear on the part of the wheel's tread.

DETAILED DESCRIPTION OF THE PREFERRED EMBODIMENTS

As shown on the attached drawings, a cart or other mobile platform, which is not shown, contains a wheel 2 which is capable of swivelling around the vertical swivel axle 3 and of being locked or unlocked by the rotation of the wheel 2 in one direction or the other. The wheel 2 contains a horizontal rotating axle 4 whose ends are supported by at least two lateral extensions or forks 5 of a fork joint 6. The upper end of the fork joint, which is in the form of a circular cover 7, is fastened by means of a thrust bearing 8 to the lower end of the vertical swivel axle 3. It may be noted that the vertical swivel axle is laterally offset in relation to the vertical plane passing through the horizontal axle 4 of the wheel 2.

Figure 1:
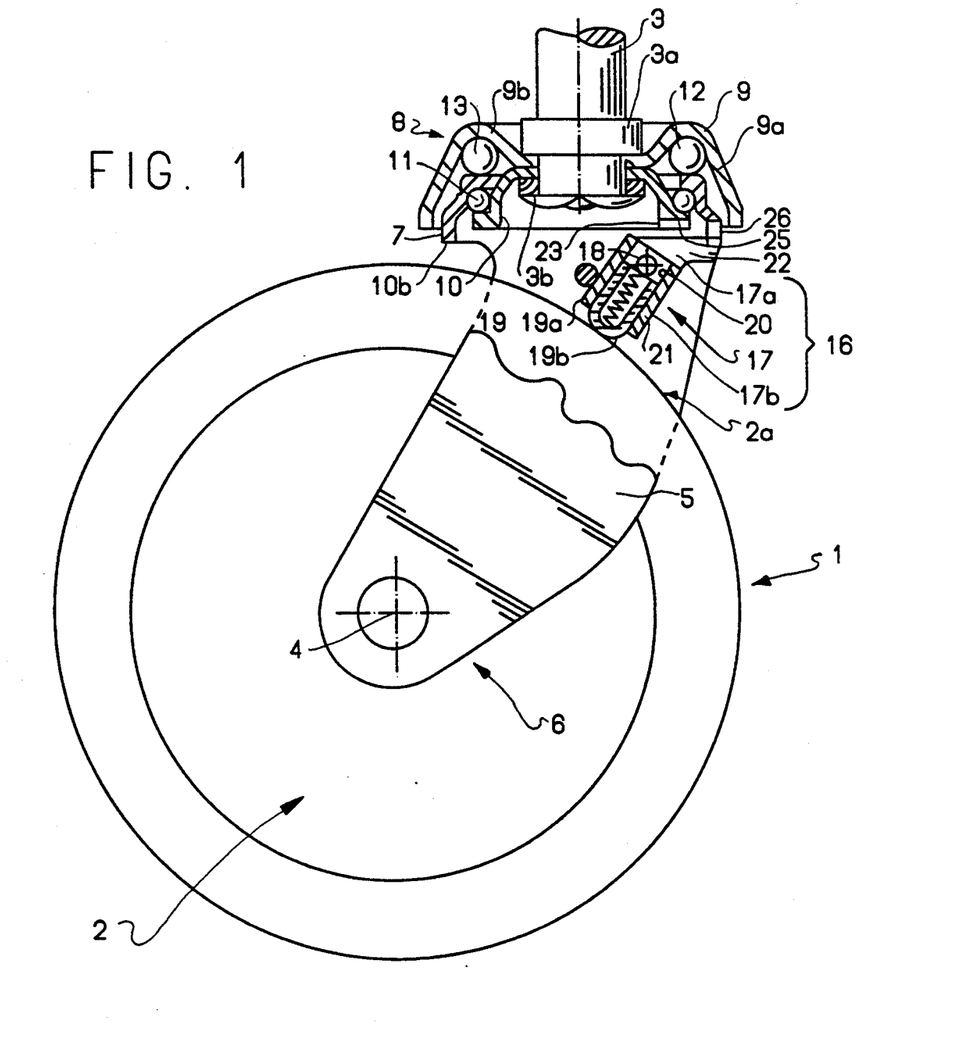
FIG. 1 is a side elevation, partly in cross-section, of a first embodiment of the swivelling wheel assembly of the present invention.
Figure 2:
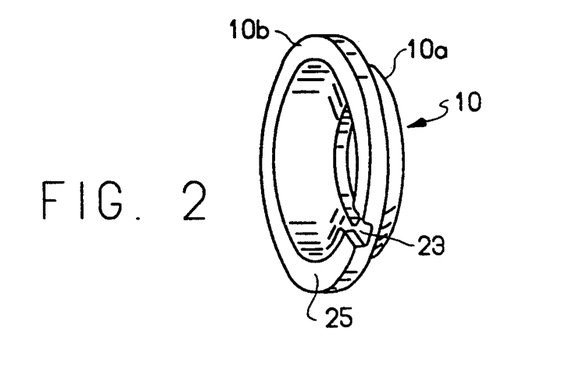
FIG. 2 is a perspective view of one part of the locking device of the present invention.
Figure 3:
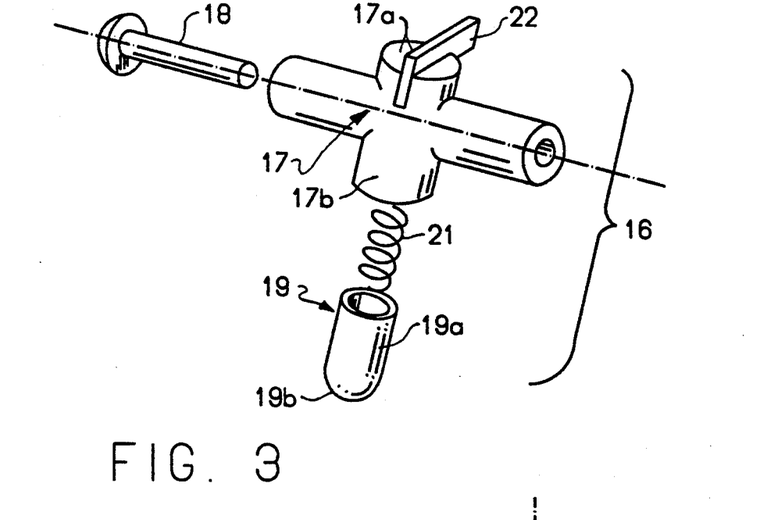
FIG. 3 is an exploded perspective view of the several components which make up the second part of the locking device.
Figure 4:
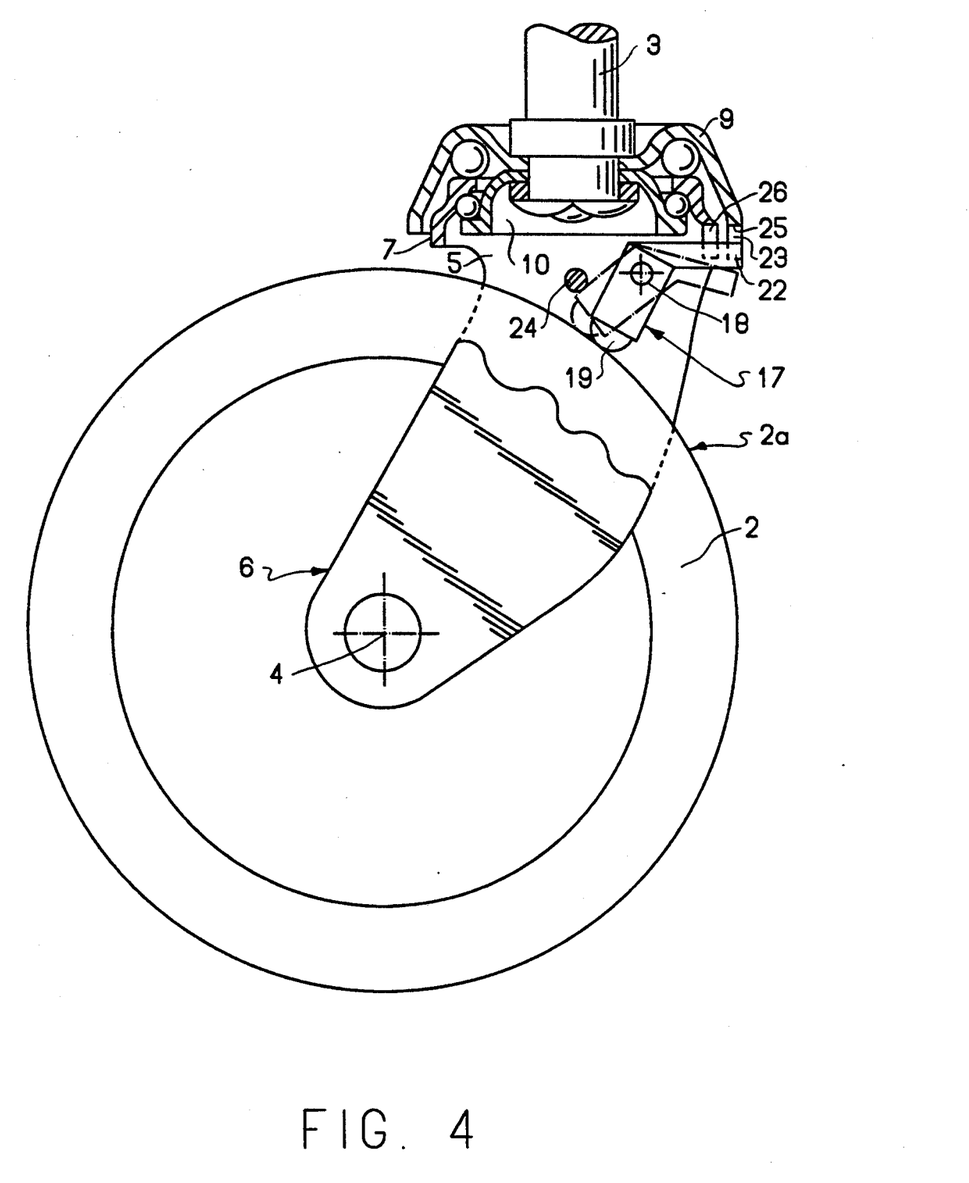
FIG. 4 is a side elevation, partly in cross-section, of a second embodiment of the swivelling wheel assembly of the present invention.

As can be seen on FIGS. 1 and 4, the thrust bearing 8 includes a first circular housing 9 and a second circular housing 10 fixedly mounted, like the first, on the lower end of the vertical axle 3. The two housings 9 and 10 are open at the bottom. The first housing 9 is an external housing and is located above the second lower housing 10 and has an external rounded extension 9a and a circular downwardly turned base portion 9b which, in the area of the internal opening, rests on the circular base 10a of the lower housing 10. The two housings 9, 10 are mounted on the vertical axle 3 and their inner edges are enclosed by two ring-shaped collars 3a, 3b of the vertical axle 3.

At its lower end, the lower housing 10 has an outer circular edge 10b whose upper surface serves as the rolling path for a first series of roller bearings or similar devices 11 which support the circular cover 7 of the fork joint 6. In the area of the circular junction between the rounded extension 9a and the circular base portion 9b, the upper housing 9 defines a rolling path in the form of a groove 12 which houses a second series of roller bearings 13 resting on the upper side of the circular cover 7.

As shown in FIGS. 1 and 4, the external housing 9 covers and surrounds, particularly on its lower side, the circular cover 7 and the lower housing 10. The lower housing 10 is, in turn, enclosed by the cover 7.

Figure 6:
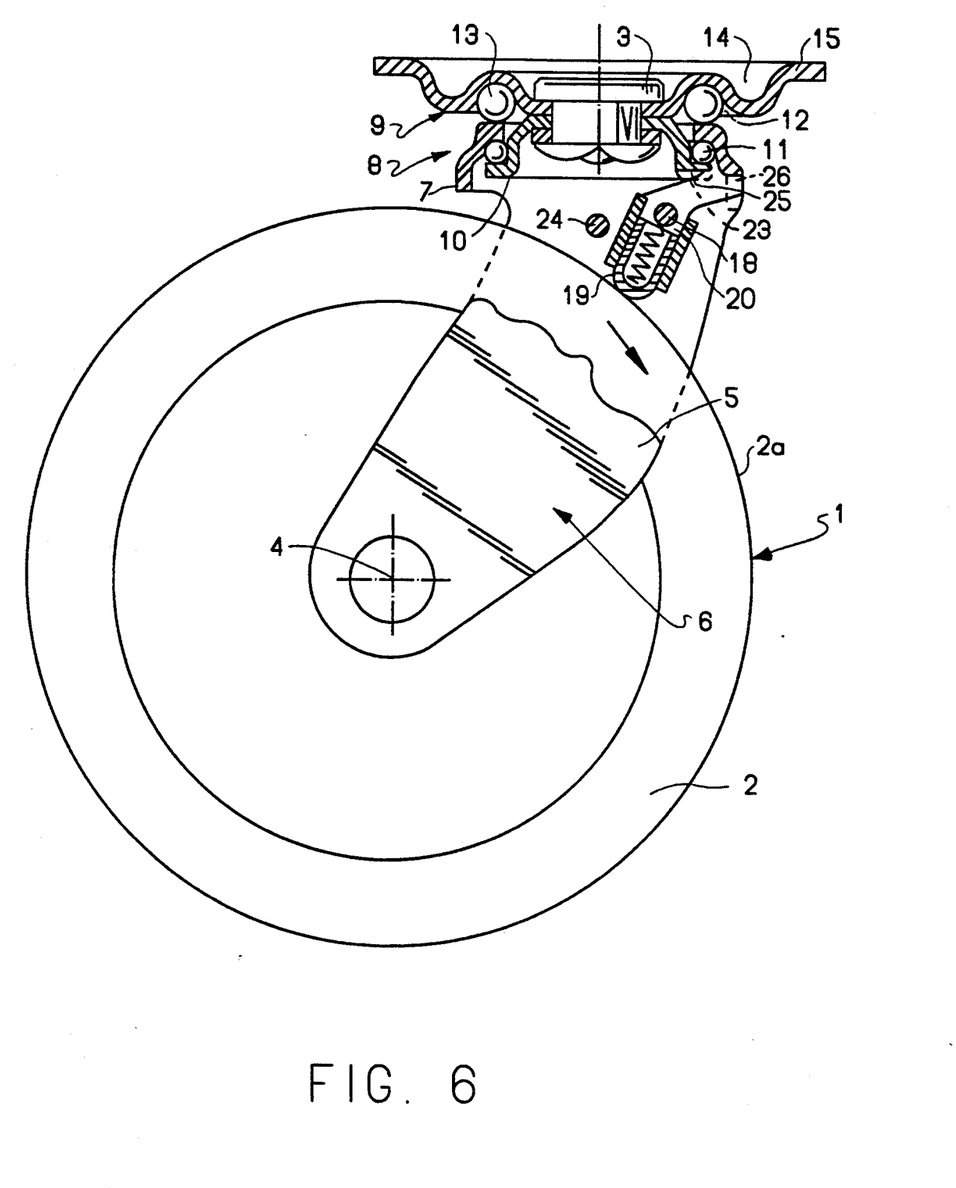
FIG. 6 is a side elevation, partly in cross-section, of a fourth embodiment of the present invention.

It is possible to use an upper housing 9 whose extension 9a is curved upwards from the outer edge of the groove 12. In such a construction, which is shown in FIG. 6, the housing 9 is open toward the bottom in order to have a circular external groove 14 adjacent to the groove 12. The groove 14 is open toward the top and is slightly deeper than the groove 12. The groove 14 is bounded by a horizontal flange 15 which is slightly raised and can be used, for example, to fasten the bearing 8 to the connecting receptacle of a cart which is not shown.

Figure 5:
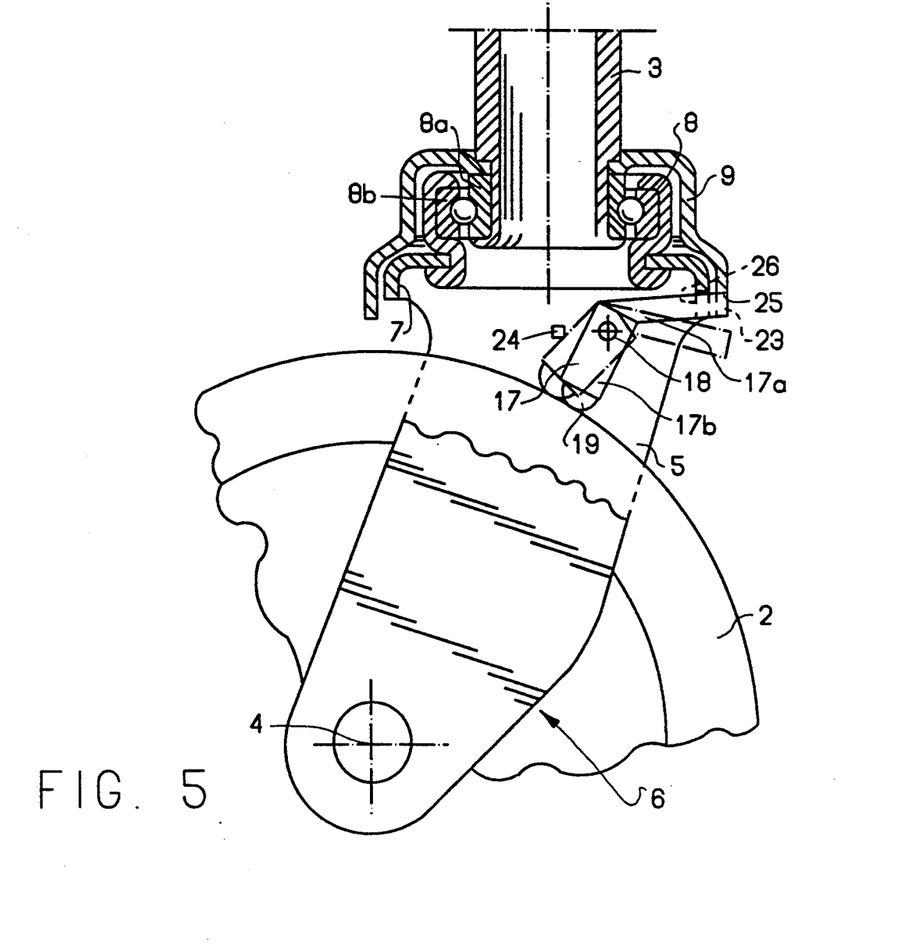
FIG. 5 is a side elevation, partly in cross-section, of a third embodiment of the swivelling wheel assembly of the present invention.

In the embodiment shown in FIG. 5, the thrust bearing 8 carries two roller flanges 8a, 8b. The second roller flange 8b encloses the first flange 8a and is fixed to the circular cover 7 for the fork joint 6. The first flange 8a is, in turn, fixedly mounted on the vertical axle 3 and the external housing 9.

The swivelling wheel 1 also contains a locking device 16 for the fork joint 6. The locking device includes two parts. One part is mounted on the fork joint while the other part is fixed relative to the vertical axle 3. The part of the locking device on the fork joint includes a pivot mechanism 17 in the form of a double curved control lever which has an upper lever arm 17a and a lower lever arm 17b, which encompass an angle of between 90° and 160°. This double curved control lever 17 is housed in the space between the thrust bearing 8, the lateral extensions 5 of the fork joint 6 and the wheel 2. In the examples shown in FIGS. 1, 4 and 5, the lever is located vertically between the upper or external housing 9 of the bearing 8 and the tread 2a of the wheel 2, and laterally between the lateral extensions 5 of the fork joint 6. The joining piece between the two lever arms 17a, 17b is connected to the lateral extensions 5 of the fork joint 6 using a single horizontal axle 18 or two coaxial pivot axles 18 riveted onto the extensions 5. The pivot axle 18 of the lever 17 is located on the side of the fork joint 6 on which the vertical distance between the locking device 16 and the tread 2a of the wheel 2 is the greatest.

The locking device 16 also includes a friction device 19 installed on the lower end of the lower lever arm 17b and permanently and resiliently applied to the tread 2a of the wheel 2. This friction device is capable of causing the double control lever 17 to pivot toward one of two outermost positions about the pivot axle 18. In one such position, the supporting fork joint is immobilized in relation to the vertical axle 3; and in the other, the fork joint 6 is free to rotate in relation to the vertical axle 3.

The friction device 19 consists of a tubular piston 19a which is guided so that it can slide axially in a housing 20 with an appropriate section, for example, a circular section, constructed coaxially in the lower lever arm 17b in such a manner as to be open at the bottom. The lower end 19b of the tubular piston projects from the housing 20 in the lower lever arm 17b, and is shaped as a spherical cap. A spring 21 is contained in the lower lever arm 17b and pushes the friction device 19 against the tread 2a of the wheel 2. This spring 21 is placed partially inside the tubular piston 19a and partially outside the piston in the housing 20 of the lower lever arm 17a. The upper end of the spring engages against the pivot axle 18. Alternatively, the upper end of the spring can engage against an internal flange in the housing 20 or other internal structure of the double control lever 17. At its other lower end the spring engages against the friction device 19, and, more precisely against the internal surface of the spherical cap 19b.

The locking device 16 also includes a locking means 22 consisting of a tip which extends from and is an integral part of the free end of the upper lever arm 17a. The locking means 22 extends perpendicularly to the pivot axle 18 of the lever 17 in the direction toward the periphery of the thrust bearing.

The remaining part of the locking device 16 includes a second locking means 23 which is located on a component of the wheel assembly which remains stationary during rotation of the fork joint 6 about the axle 3. The locking means 23 operates in conjunction with the locking means 22 to immobilize the supporting fork joint 6 against rotation on its vertical swivel axle 3. As shown in FIGS. 1 and 6, the locking means 23 is located in the inner, lower housing 10 of the thrust bearing 8. Alternatively, in the embodiments of FIGS. 4 and 5, the locking means 23 is an integral part of the external stationary housing 9 of the bearing 8.

The locking means 23 consists of a locking slot open in the direction of the first locking means 22 and capable of receiving, without any significant lateral play, the first locking means, that is to say, the locking tip 22 which is an integral part of the upper lever arm 17a. This slot 23 is located along a vertical center plane of the fork joint 6. This plane passes through the axis of the vertical axle 3 and is perpendicular to the horizontal axis 4 of the wheel 2 and to the horizontal pivot axle 18 of the double lever 17 when the cart on which the swivelling wheel assembly 1 is mounted moves straight ahead. As can be seen in the drawing, the pivot axle 18 of the double lever 17 is located near the periphery of the circular cover 7 of the fork joint 6 and also near the locking slot 23.

Finally, the locking devices 16 include two stops 24, 25 which serve to limit the pivot angle of the double control lever 17 between its two outermost positions. These two stops form with the pivot axle 18 a relatively small angle on the order of 3° to 15°, and are located in proximity to a radial plane of the wheel 2. The latter plane passes through the lever's pivot axle 18 and the wheel's axle 4 of rotation. In this manner, the lower lever arm 17b shall not deviate overly from a position in which its axis extends vertically in relation to the tread 2a, i.e., perpendicular to the surface of the tread where engagement with the friction device 19 occurs.

The first stop 24 for the control lever 17 is placed in the space located above the wheel 2 and between the lateral extensions 5 of the fork joint 6 and works in conjunction with a first portion, for example, the lower lever arm 17b of the control lever 17, while the second stop consists of the downwardly facing bottom surface of the locking slot 23 and the downwardly facing bottom edge surface of the housing 9 or 10 which contains the slot 23. The stop 25 works in conjunction with the locking tip 22 to limit the pivoting of the lever 17 in the counter-clockwise direction as viewed in the drawings.

The circular cover 7 of the fork joint 6 contains a tracking groove 26 along the center vertical plane of the fork joint 6. This groove lies in a plane perpendicular to the axle 4 of the wheel 2 and the pivot axle 18 of the double lever 17; and, as with the locking device 16, is located on the side of the fork joint 6 on which the distance between the cover 7 and the tread 2a is the greatest. The tracking groove 26 is open at the bottom and 25 aligned with the upper lever arm 17a and locking tip 22 so as to guide, with no significant lateral play, these members in their pivoting path between the control lever's 17 outermost positions. Due to this construction, the locking of the fork joint 6 is transmitted to the swivel axle 3 along the shortest distance between the swivelling fork joint 6 and housing 9 and 10 which is fixedly mounted on the vertical swivel axle 3.

The locking slot 23 may be placed radially outwardly of the tracking groove 26 formed in the cover 7 as in the construction of FIGS. 4 and 5 where the slot 23 is located on the external housing 9. The locking slot 23 may also be placed radially inwardly of the groove 26 as in the construction shown in FIGS. 1 and 6 where the slot is placed on the internal housing 10.

We claim:

1. In a swivelling wheel assembly (1) containing a wheel (2) whose swivelling action around a vertical swivel axle (3) having a lower end may be locked or unlocked by rotating the wheel (2) in one direction or the other, respectively, the assembly including a fork joint (6) having an upper end (7) and a lower end with the upper end (7) mounted on the lower end of the vertical swivel axle (3), for selectively swivelling action around said vertical axle (3), a horizontal axle (4) fixed to the lower end of the fork joint for mounting the wheel (2) for rotation about a horizontal axle which is fixed relative to the fork joint, and a locking device (16) for locking the fork joint (6) in relation to the vertical swivel axle (3), the improvement wherein: the locking device (16) comprises a) a first locking part (23) fixed relative to said vertical axle (3); and b) a second locking part mounted on the fork joint (6), said second locking part including:

i) a control means (17) having two ends (19, 22), said control means being mounted on the fork joint for movement between a first position and a second position, one end (19) of said ends extending downwardly engaging against the wheel (2), and the other end (22) being positioned adjacent said first locking part (23) for movement between a first wheel locking position engaging with said first locking part (23) and a second wheel unlocking position spaced from said first locking part (23) upon movement of said control means between said first position and said second position, and ii) means (21) for maintaining the one end (19) of the control means (17) in driven engagement with said wheel for limited movement with the wheel between two positions as the wheel rotates in opposite directions whereby the rotation of the wheel in one direction moves the one end (19) to one position and the second end (22) to said first wheel locking position and rotation of the wheel in a second opposite direction moves the one end (19) to a second position and the second end (22) to said second wheel unlocking position.

2. In a swivelling wheel assembly (1) containing a wheel (2) whose swivelling action around a vertical axle (3), having a lower end, may be locked or unlocked by rotating the wheel (2) in one direction or the other, respectively, the assembly including a bearing (8), at least one housing (9, 10) fixedly mounted to the lower end of the vertical swivel axle (3), a fork joint (6) having two lateral extensions (5) whose lower ends support a horizontal axle (4) for the wheel (2) and whose upper end includes a cover (7) which cooperates with the bearing (8) to permit rotation of the fork joint around the axle (3), and a locking device (16) for locking the fork joint (6) in relation to the vertical swivel axle (3), the improvement wherein:

the locking device (16) comprises:

a) a first locking part (23) fixed relative to said vertical axle (3) and located within the outer lateral periphery of the housing (9); and b) a second locking part located vertically between the bearing (8) and the wheel (2) and laterally between the extensions (5) of the fork joint (6) so as to be protected against damage by contact therewith by objects externally of the wheel assembly, said second locking part including:

i) a control means (17) having two ends (19, 22), said control means being mounted between the extensions (5) of the fork joint (6) for movement between a first position and a second position, one end (19) of said ends extending downwardly engaging against the wheel (2), and the other end (22) being positioned adjacent said bearing (8) and the lower end of the vertical axle (3) for movement between a first wheel locking position engaging with said first locking part (23) and a second wheel unlocking position spaced from said first locking part (23) upon movement of said control means between said first position and said second position, and ii) means (21) for maintaining the one end (19) of the control means (17) in driven engagement with said wheel for limited movement with the wheel between two positions as the wheel rotates in opposite directions whereby the rotation of the wheel in one direction moves the one end (19) to one position and the second end (22) to said first wheel locking position and rotation of the wheel in a second opposite direction moves the one end (19) to a second position and the second end (22) to said second wheel unlocking position.

3. In a swivelling wheel assembly (1) containing a wheel (2) whose swivelling action around a vertical axle (3) may be locked or unlocked by rotating the wheel (2) in one direction or the other, the assembly including a thrust bearing (8) which has at least one housing (9, 10) fixedly mounted to the lower end of the vertical swivel axle (3), a fork joint (6) having two lateral extensions (5) whose lower ends support a horizontal axle (4) for the wheel (2) and whose upper end includes a cover (7) which cooperates with the bearing (8) to permit rotation of the fork joint around the axle (3) and a locking device (16) for locking the fork joint (6) in relation to the vertical swivel axle (3), the improvement wherein:

the locking device (16) comprises:

a) a first locking part (23) fixed relative to said vertical axle (3) and located within the outer lateral periphery of the housing (9); and b) a second locking part located vertically between the thrust bearing (8) and the wheel (2) and laterally between the extensions (5) of the fork joint (6) so as to be protected against damage by contact therewith by objects externally of the wheel assembly, said second locking part including:

i) a double control lever (17) having two ends (19, 22), said control lever being pivotally mounted intermediate its ends on an axle (18) located between the extensions (5) of the fork joint (6) for pivoting movement between a first outermost position and a second opposite outermost position, one end (19) of said ends extending downwardly engaging against the wheel (2), and the other end (22) being positioned adjacent said thrust bearing (8) and the lower end of the vertical axle (3) for movement between a first wheel locking position engaging with said first locking part (23) and a second wheel unlocking position spaced from said first locking part (23) upon pivoting of said control lever between said first outermost position and said second outermost position, and ii) means (21) for maintaining the one end (19) of the lever (17) in driven engagement with said wheel for limited movement with the wheel between the two positions as the wheel rotates in opposite directions whereby the rotation of the wheel in one direction moves the one end (19) to one position and the second end (22) to said first wheel locking position and rotation of the wheel in a second opposite direction moves the one end (19) to a second position and the second end (22) to said second wheel unlocking position.

4. In the swivelling wheel assembly in accordance with claim 3, the improvement wherein:

a) at least one of said housings (9, 10) is circular in lateral dimension as measured around said vertical axle (3) and includes a bottom circular peripheral surface facing the other end (22) of said control lever (17) and in vertical axial alignment therewith throughout the swivelling action of said wheel assembly around said vertical axle (3);

b) said first locking part (23) is defined by a vertically extending slot (23) in the housing (9, 10) extending upwardly from said bottom circular peripheral surface to a bottom surface; and c) the other end (22) of the control lever (17) engages within said slot (23) when in said first wheel locking position.

5. In the swivelling wheel assembly in accordance with claim 4, the improvement wherein:

a) the cover (7) of the fork joint (6) is circular in lateral dimension as measured around said vertical axle (3) and includes a vertically extending tracking groove (26); and b) said other end (22) of said control lever is rotatably fixed relative to said cover and vertically slidable in said tracking groove (26) as the control lever pivots about said axle (18).

6. In the swivelling wheel assembly in accordance with claim 5, the improvement wherein:

a) the bearing (8) includes an outer circular housing (9) and an inner circular housing (10) with the outer housing (9) circumferentially surrounding and vertically covering the inner housing (10);

b) the cover (7) is located between said inner and outer housing (9, 10); and c) the vertically extending slot is formed in the inner housing (10).

7. In the swivelling wheel assembly in accordance with claim 5, the improvement wherein:

a) the bearing (8) includes an outer circular housing (9) and an inner circular housing (10) with the outer housing (9) circumferentially surrounding and vertically covering the inner housing (10);

b) the cover (7) is located between said inner and outer housings (9, 10); and c) the vertically extending slot (23) is formed in the outer housing (9).

8. In the swivelling wheel assembly in accordance with claim 4, the improvement further comprising:

a) first and second means (24, 25) for limiting the pivoting movement of the control lever (17) between said first and second outermost positions;

i) said first stop means including a stop member extending between the lateral extensions (5) of the fork joint (6) and in the path of pivoting movement of a portion of the lever located below said axle (18), and b) said second stop means is defined by the lower surface of said housing (9, 10) and the bottom surface of said vertically extending slot (23).

9. In the swivelling wheel assembly in accordance with claim 8, the improvement wherein:

a) said vertically extending slot (23) is aligned with the direction of linear movement of the wheel upon rotation thereof in said one direction.

10. In the swivelling wheel assembly in accordance with claim 9, the improvement wherein:

a) the fork joint (6) is mounted on the vertical axle (3) for swivelling movement to a first position with the axle (4) of the wheel (2) located at a position behind the axle (3), as measured in the direction of linear movement of the wheel (2), when said wheel is rotated in said one direction.

11. In the swivelling wheel assembly in accordance with claim 10, the improvement wherein:

a) the vertical slot (23) and the control lever (17) are located at a position forwardly of the vertical axle (3), as measured in the direction of linear movement of the wheel (2), when the wheel is rotated in said one direction and the fork joint is swivelled to said first position.

12. Swivelling wheel assembly (1) containing a wheel (2) whose swivelling action around a vertical axle (3) may be locked or unlocked by rotating the wheel (2) along its thread (2a) in one direction or the other, respectively, said assembly comprising a thrust bearing (8) which has at least upper circular housing (9) which is fixedly mounted, by its center section, to the lower end of the vertical swivel axle (3), a fork joint (6) having a center plane and including at least two lateral extensions (5) whose lower end support a horizontal axle (4), extending perpendicular to said center plane, for the wheel (2), an upper circular cover (7) connected to the upper ends of the lateral extensions )5) and connected to the thrust bearing at the lower end of the vertical axle (3) for rotation about said axle, a locking device (16) for locking the fork joint (6) in relation to the vertical swivel axle (3); said locking device including:

a) a double control lever (17) housed in the space enclosed by the lateral extensions (5) of the fork joint (6), the bearing (8) and the periphery of the wheel (2) and having an upper lever arm (17a) with a free end and a lower lever arm (17b) encompassing an angle of between 90° and 160°, said lever (17) including:

b) a horizontal axle (18) extending between said extensions (5) pivotally mounting said lever between the periphery of the wheel (2) and the thrust bearing (8)

with the lower arm (17b) moving between two outermost positions located in the proximity of a radial plane passing through and parallel to the pivot axle (18) of the cover lever (17) and the swivel axle (3) of the wheel (2);

c) the lower arm (17b) comprises a friction device (19) resiliently urged into frictional engagement against a portion of a wheel (2) and capable of causing the control lever (17) to pivot between said two outermost positions, in one of which the fork joint (6) is stopped from rotating about the vertical axle (3), and in the other of which, the fork joint (6) is free to rotate about the vertical axle (3);

d) a first locking means (23) fixed relative to the vertical axle (3) and a second locking means (22) integral with the free end of the upper lever arm (17a) and in operative position relative to the first locking means (22) for immobilizing the fork joint (6) on its vertical axle (3), said first locking means (23) extending perpendicular to the pivot axle (18) of the lever (17) and toward the periphery of the thrust bearing (8) and including a locking slot (23) capable of receiving the second locking means (22) within significant lateral play;

e) two stops (25, 25), at least one of which is connected to the fork joint (6) to limit the pivot angle of the control lever (17) between its two outermost positions;

f) said one stop being located in the space located above the wheel (2) and between the lateral extensions (5) of the fork joint (6) and cooperating with a first portion (17b) of the control lever (17) and the second stop (25) defined by the bottom of the locking slot (23) and the lower bottom of at least one housing (9, 10) for cooperating with the second locking means (22) of the upper lever arm (17a); and g) a tracking groove (26) in the circular cover (7) of the fork joint (6), said groove extending along the center plane of the fork joint, perpendicular to the axle (4) of the wheel (2) and the pivot axle (18) of the control lever (17), said tracking groove (26) being open at the bottom and receiving, without significant lateral play, a portion of the upper lever arm (17a) and the second locking means (22) throughout its path between the two outermost positions of said control lever.

13. Swivelling wheel assembly in accordance with claim 12, wherein the housing (9) for the thrust bearing (8) contains a rounded extension (9a) whose lower edge covers and encloses the cover (7) and upper end of the fork joint (6).

14. Swivelling wheel assembly in accordance with claim 12, wherein the friction device (19) is continually urged against the tread (2a) of the wheel (2) by the action of a spring (21) contained in the lower lever arm (17b) and guided axially in relation thereto.

15. Swivelling wheel assembly in accordance with claim 14, wherein the lower lever arm (17b) includes housing (20) which is open at the bottom and slideably receives said friction device (19) and spring (21).

16. Swivelling wheel assembly in accordance with claim 15, wherein the housing (20) extends upwardly from the open bottom of the lower lever arm (17b) to the pivot axle (18) and one end of the spring (21) engages on the pivot axle (18) and the other end engages against the friction device (19).

17. Swivelling wheel assembly in accordance with claim 16, wherein the friction device (19) is a tubular piston (19a) which slides into the housing (20) and whose lower end projects from the lower lever arm (17b) and is enclosed by a spherical cap and the other end of the spring (21) is housed within the tubular piston (19a).

18. Swivelling wheel assembly in accordance with claim 12, wherein the thrust bearing (8) includes a lower circular housing (10) having an open bottom and which is located within and under the first upper circular housing (9) and is fixedly mounted on the lower end of the vertical swivel axle (3), and the circular cover (7) of the fork joint (6) is located between two horizontal series of roller bearings (11, 13) so that it can rotate around the vertical swivel axle (3).

19. Swivelling wheel assembly in accordance with claim 12, wherein the thrust bearing (8) has first and second roller flanges (8a, 8b), of which the second roller flange (8b) engages the first flange (8a) and is an integral part of the circular cover (7) of the fork joint (6), and the first flange (8a) is an integral part of the vertical axle (3) and of the upper circular housing (9).

20. Swivelling wheel assembly in accordance with claim 18, wherein the locking slot (23) is constructed in a lower surface of the lower housing (10) of the thrust bearing (8) and the second locking means (22) on the upper lever arm (17a) is located within the circumferential periphery of the cover (7) of the fork joint (6).

21. Swivelling wheel assembly in accordance with claim 12, wherein the locking slot (23) is constructed in a lower surface of the upper circular housing (9) of the thrust bearing (8) and the locking means (22) on the upper lever arm (17a) is located substantially within the circumferential periphery of the upper housing (9) of the thrust bearing (8).

22. Swivelling wheel assembly in accordance with claim 12, wherein the first stop (24) consists of a transverse rod extending parallel to the pivot axle (18) of the double lever (17) between the extensions (5) of the fork joint (6) and mounted on the latter for engagement with the lower lever arm (17b).

* * * * *

UNITED STATES PATENT AND TRADEMARK OFFICE
CERTIFICATE OF CORRECTION

PATENT NO. : 5,263,226
DATED : November 23, 1993
INVENTOR(S) : Jean-Pierre Roy, et. al.

It is certified that error appears in the above-indentified patent and that said Letters Patent is hereby corrected as shown below:

On the Title page, item [75], Inventor: add Claude G. Bertrand, and Auluoy s/bois, France.

Signed and Sealed this

Seventh Day of June, 1994

Attest:

BRUCE LEHMAN

Attesting Officer     Commissioner of Patents and Trademarks